United States Patent [19]

Kochan

[11] Patent Number: 4,827,506
[45] Date of Patent: May 2, 1989

[54] TELEPHONE RECEIVER ADAPTOR

[76] Inventor: Branislav R. Kochan, #5, 2368 Millbourne Rd. W., Edmonton, Alberta, Canada, T6K 3B4

[21] Appl. No.: 914,409

[22] Filed: Oct. 2, 1986

[51] Int. Cl.⁴ .......................................... H04M 1/03
[52] U.S. Cl. .................................................... 379/433
[58] Field of Search .............. 379/428, 433, 434, 440, 379/430, 447, 450

[56] References Cited

U.S. PATENT DOCUMENTS 2,501,830  11/1948  Ruml, Jr. ............................ 379/440
3,231,688  1/1966  Ugartechea ........................ 379/447

FOREIGN PATENT DOCUMENTS 514149  2/1955  Italy .

Primary Examiner—Jin F. Ng
Assistant Examiner—Danita R. Byrd
Attorney, Agent, or Firm—William R. Hinds; George H. Dunsmuir

[57] ABSTRACT

The conventional earpiece for a telephone handset includes a raised outer periphery surrounding a depression, the bottom of which is perforated for facilitating the transmission of sound from a receiver to the ear of the user. During normal usage, the raised periphery of the earpiece presses against the earlobe of a user. If the user is wearing an earring, use of the handset even for a short period of time can be uncomfortable. A simple solution to this problem is to provide a radially extending notch in the raised periphery of the earpiece for accommodating the earlobe and the earring of the user. Preferably the position of the notch can be changed to suit the particular user via a construction in which the notched outer portion is readily rotatable relative to an inner portion attachable to the handset, with the two portions being formed with a cooperating flange and groove arrangement permitting the relative rotation without affecting the attachment of the inner portion to the handset.

5 Claims, 2 Drawing Sheets

U.S. Patent    May 2, 1989    Sheet 1 of 2    4,827,506
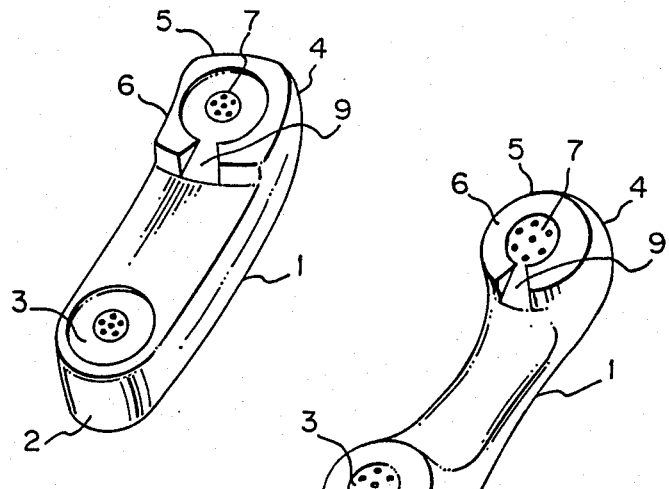
FIG.1
FIG.2
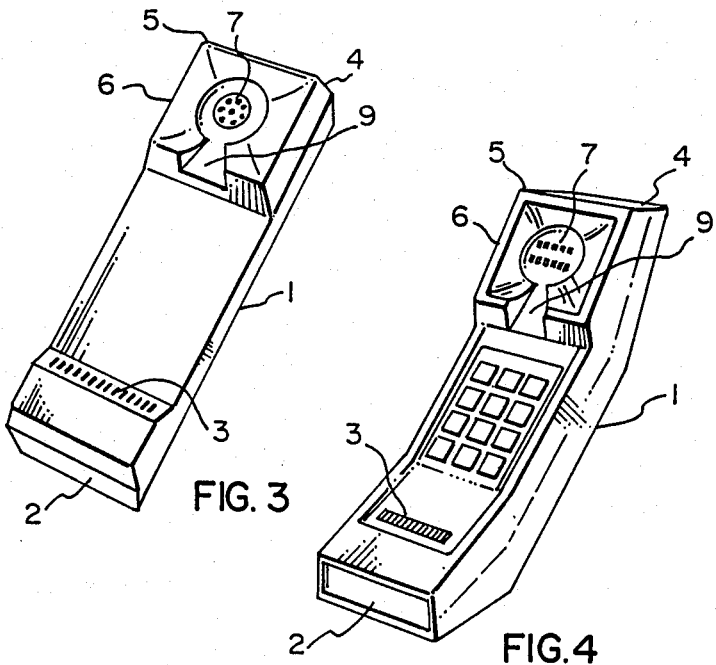
FIG.3
FIG.4

TELEPHONE RECEIVER ADAPTOR

BACKGROUND OF THE INVENTION

This invention relates to an earpiece for a telephone handset, and in particular to an earpiece for use by a person wearing an earring.

The conventional telephone handset includes a casing, one end of which contains a transmitter which is covered by a perforated mouthpiece, and the other end of which contains a receiver covered by an earpiece. The earpiece includes a raised periphery surrounding a concave depression or recess, the bottom of which includes perforations. During use, the raised periphery of the earpiece is pressed against the ear of the user. If the user is wearing an earring, such pressure can produce discomfort.

The object of the present invention is to offer a solution to the above-identified problem by providing an earpiece for use on a telephone handset which can be used comfortably by a person wearing an earring, small hearing aid or the like.

SUMMARY OF THE INVENTION

Accordingly, the present invention relates to an earpiece for a telephone handset comprising a first inner portion for attachment to the handset, and a second outer portion rotatably mounted on said first portion, said second portion including an elevated periphery and a recessed central portion at least partially surrounded by said periphery, said periphery being recessed via a generally radially extending notch formed therein over part of its peripheral extent such that the earpiece can be used with comfort by a user wearing an earring, with the earring extending into the notch, and said second portion is readily rotatable relative to the first portion to vary the location of the notch to suit the user without affecting the attachment of said first portion to the handset, and wherein said first portion comprises internally threaded ring means for threaded attachment to the handset, one of said ring means and said second portion being formed with groove means and the other being formed with flange means slidably disposed in said groove means so as to permit said relative rotation.

It will be appreciated that the earpiece defined above virtually eliminates the need to remove earrings prior to using a telephone.

BRIEF DESCRIPTION OF THE DRAWINGS

The invention will now be described in greater detail with reference to the accompanying drawings which illustrate a preferred embodiment of the invention, and wherein:

FIGS. 1 to 4 are schematic, perspective view of a variety of conventional telephone handsets incorporating an earpiece in accordance with the present invention;

DESCRIPTION OF THE EMBODIMENTS

Figure 5:
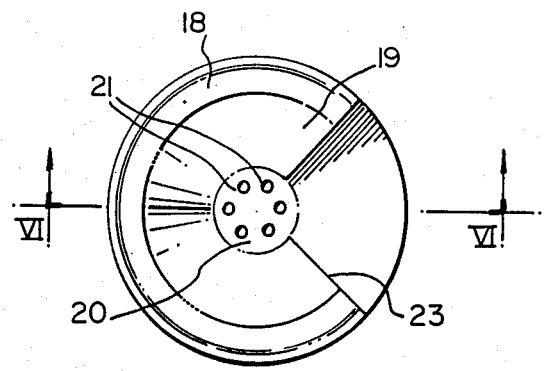
FIG. 5 is a plan view of another form of earpiece in accordance with the invention for use on a conventional telephone handset.

With reference to FIGS. 1 to 4, telephone handsets currently in use have a variety of configurations, but, in general, include elongated casings 1, with a transmitter (not shown) in one end 2 thereof covered by a perforated plate 3 facilitating the transmission of sound. The other end 4 of the casing 1 includes an earpiece 5 covering a receiver (not shown). The earpiece 5 is defined by a raised periphery 6 surrounding a perforated central plate 7, which covers the receiver.

During normal use, the raised periphery 6 of the earpiece 5 presses against the ear. If the user is wearing an earring, the raised periphery 6 can cause considerable discomfort. Often, a user wearing an earring will remove the earring before placing the earpiece 5 against the ear.

In accordance with the present invention, this problem is solved by providing a radially extending notch 9 through the raised periphery 6, so that when the earpiece 5 is pressed against the ear, the earlobe and all or a portion of the earring extends into the notch 9. Thus, there is no pressure on the earring, or consequently on the earlobe of the user. The notch 9 is placed inwardly towards the end 2 of the casing 1 to a position where the earlobe is normally located during use of the handset. The preferred shape of the notch 9 is a segment of a circle. Obviously the inner end of the notch 9 can be narrower than the outer end, since most earrings are narrower at their upper ends than at the lower ends thereof.

Figure 6:
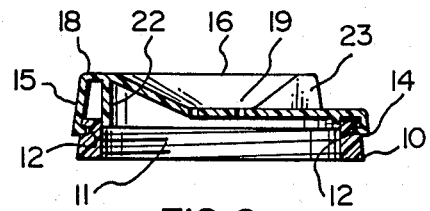
FIG. 6 is a cross-section taken generally along line VI—VI of FIG. 5.

The embodiment of the invention shown in FIG. 2 to 4 is intended for use with modern telephone handsets, the casings 1 of which are normally defined by two or more pieces defining top and bottom or inner and outer portions of the casing 1. In such handsets, the mouthpiece and earpiece are defined by one piece of plastic. The embodiment of the invention shown in FIGS. 5 and 6 is intended for use with the conventional, old fashion handset of the type including removable covers on the mouthpiece and earpiece ends of the handset casing. For such purpose, the ends of the casing include reduced diameter, externally threaded portions for receiving the internally threaded, generally disc-shaped mouthpieces and earpieces.

The earpiece of FIGS. 5 and 6 includes an internally threaded ring 10 for mounting on the externally threaded earpiece end of the handset casing. The ring 10 tapers outwardly and includes internal threads 11 for mounting the ring on the earpiece end of a telephone handset. An annular groove 12 is provided in the outer surface of the ring 10 for receiving an annular flange 14, extending inwardly from the side wall 15 of an outer portion 16 of the earpiece casing.

The outer portion 16 of the earpiece casing includes a raised annular periphery 18 bordering a frusto-conical depression 19, which extends downwardly and inwardly to a circular centre 20. Perforations 21 for facilitating the transmission of sound are provided in the circular centre 20 of the outer casing portion 16. An annular inner wall 22 extends downwardly from the inner periphery of the raised portion 18 into sliding engagement with the smooth outer portion of the ring 10. Thus, the ring 10 can be connected to the earpiece end of the handset casing, and the outer portion 16 can be rotated.

A radially extending notch 23 is provided in one side of the outer portion 16 of the earpiece casing for placing over the earlobe and an earring of a user. It will be appreciated that rotation of the outer portion 16 facilitates alignment of the segment-shaped notch 23 with the earlobe and earring of the user.

Thus, there has been described a relatively simple earpiece for a telephone handset which is particularly adapted to users wearing one or more earrings.

What I claim is:

1. An earpiece for a telephone handset comprising a first inner portion for attachment to the handset, and a second outer portion rotatably mounted on said first portion, said second portion including an elevated periphery and a recessed central portion at least partially surrounded by said periphery, said periphery being recessed via a generally radially extending notch formed therein over part of its peripheral extent such that the earpiece can be used with comfort by a user wearing an earring, with the earring extending into the notch, and said second portion is readily rotatable relative to the first portion to vary the location of the notch to suit the user without affecting the attachment of said first portion to the handset, and wherein said first portion comprises internally threaded ring means for threaded attachment to the handset, one of said ring means and said second portion being formed with groove means and the other being formed with flange means slidably disposed in said groove means so as to permit said relative rotation.

2. An earpiece for a telephone handset as claimed in claim 1 wherein the recessed central portion of said second portion has plural perforations for sound transmission, and said first portion is of hollow ring form.

3. An earpiece for a telephone handset as claimed in claim 1 wherein said groove means is formed in the outer peripheral surface of said ring means, and said flange means is formed on a side wall of said second portion to project inwardly and interengage with said groove means.

4. An earpiece for a telephone handset as claimed in claim 3 wherein said second portion has an annular inner wall extending generally axially from its inner surface into sliding engagement with an unthreaded part of the inner surface of said ring means.

5. An earpiece for a telephone handset as claimed in claim 1 wherein the rotatable mounting of said second portion on said first portion is such that said rotation of said first portion is readily effected without separating the two portions and without varying th spacing of said second portion from the receiver of a telephone handset to which said first portion may be attached.

* * * * *